US012794868B2

(12) United States Patent
Jeong

(10) Patent No.: US 12,794,868 B2
(45) Date of Patent: Nov. 10, 2026

(54) DIGITAL KEY MANAGEMENT METHOD FOR HOME-TO-HOME SERVICE

(71) Applicants: HYUNDAI MOTOR COMPANY, Seoul (KR); KIA CORPORATION, Seoul (KR)

(72) Inventor: Yong Seok Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 21 days.

(21) Appl. No.: 18/915,881

(22) Filed: Oct. 15, 2024

(65) Prior Publication Data

US 2025/0133070 A1 Apr. 24, 2025

(30) Foreign Application Priority Data

Oct. 20, 2023 (KR) ........................ 10-2023-0141259

(51) Int. Cl.
*H04L 29/00* (2006.01)
*G06Q 10/0631* (2023.01)
*G06Q 50/40* (2024.01)
*G07C 9/00* (2020.01)
*H04L 9/40* (2022.01)

(52) U.S. Cl.
CPC ...... *H04L 63/061* (2013.01); *G06Q 10/06311* (2013.01); *G06Q 50/40* (2024.01); *G07C 9/00309* (2013.01)

(58) Field of Classification Search
CPC ..... H04L 63/061; H04L 9/0827; H04L 9/088; H04L 2209/88; G06Q 10/06311; G06Q 50/40; G07C 9/00309; B60R 25/01; B60R 25/209; B60R 25/243
See application file for complete search history.

(56) References Cited

U.S. PATENT DOCUMENTS

| | | | | | |
|---|---|---|---|---|---|
| 10,589,719 | B1 * | 3/2020 | Sohn | B60R 25/241 | |
| 11,246,032 | B1 * | 2/2022 | Maass | H04L 9/0861 | |
| 11,909,872 | B2 * | 2/2024 | Inamdar | H04L 9/304 | |
| 12,081,531 | B2 * | 9/2024 | Wu | H04L 9/14 | |
| 12,142,097 | B1 * | 11/2024 | Black | B60W 40/09 | |
| 2004/0021550 | A1 * | 2/2004 | Ohtaki | G07C 9/00309 | 340/5.31 |
| 2011/0064224 | A1 * | 3/2011 | Rebuli | B60R 25/00 | 380/277 |

(Continued)

*Primary Examiner* — Don G Zhao
(74) *Attorney, Agent, or Firm* — Lempia Summerfield Katz LLC

(57) ABSTRACT

A digital key management method for a home-to-home (H2H) service includes: applying, by a service applicant, for the H2H service to a management server through an application (app) on a terminal of the service applicant; selecting, by the management server, a pick-up driver for picking up a vehicle and allowing a digital key of the vehicle to be shared and activated; handing over the vehicle by the pick-up driver to a mechanic using the activated digital key; allowing, by the management server, the digital key to be shared and activated through an app on a terminal of the mechanic; handing over the vehicle by the mechanic to the pick-up driver after performing repair and maintenance on the vehicle using the activated digital key; and dropping the vehicle off by the pick-up driver at a location desired by the service applicant.

17 Claims, 2 Drawing Sheets

(56) References Cited

U.S. PATENT DOCUMENTS

2011/0200193 A1* 8/2011 Blitz .................. H04W 12/126 707/769
2015/0302732 A1* 10/2015 Wright ............ H04N 21/42204 340/5.25
2015/0302734 A1* 10/2015 Geerlings .............. G08C 17/02 340/5.25
2019/0362272 A1* 11/2019 Kato ...................... G07C 5/008
2019/0368233 A1* 12/2019 Gengler .............. E05B 47/0611
2019/0378086 A1* 12/2019 Laye .................. G06Q 10/0833
2021/0009056 A1* 1/2021 Graglia ............... B60R 25/2063
2021/0074094 A1* 3/2021 Schumacher ........... B60L 53/14
2021/0133906 A1* 5/2021 Lota ....................... G07B 15/02
2021/0168602 A1* 6/2021 Kim ........................ H02J 50/10
2021/0390504 A1* 12/2021 Adkins ................. H04L 9/0861
2022/0014353 A1* 1/2022 Lim ......................... H04L 9/085
2022/0109662 A1* 4/2022 Jenkins ................. H04W 12/35
2022/0139197 A1* 5/2022 Kim ........................ B60R 11/04 340/933
2022/0166769 A1* 5/2022 Kwon ................. H04L 63/0807
2022/0207524 A1* 6/2022 Geusz .................. G06Q 20/227
2022/0332284 A1* 10/2022 Xiao ....................... B60R 25/30
2022/0417228 A1* 12/2022 Singh .................... H04L 63/061
2023/0222858 A1* 7/2023 Nagata ..................... G07C 9/26 713/186
2023/0322185 A1* 10/2023 Lerch ...................... H04W 4/40 340/10.5
2024/0005418 A1* 1/2024 Paik ....................... G06Q 50/10
2024/0007306 A1* 1/2024 Layouni ................ B60R 25/241
2024/0022902 A1* 1/2024 Lerch .................... H04W 12/03
2024/0160756 A1* 5/2024 Witters ............... G06F 21/6209
2024/0198961 A1* 6/2024 Ceylan .................. B60W 50/14
2024/0317179 A1* 9/2024 Sun ....................... H04W 12/04
2024/0425006 A1* 12/2024 Beiser .................. G06Q 20/322
2025/0029175 A1* 1/2025 Lin ........................ G06Q 10/02
2025/0065843 A1* 2/2025 Bu .......................... H04W 4/40
2025/0080964 A1* 3/2025 Khullar ................... H04W 4/80
2025/0141664 A1* 5/2025 Knott .................. H04L 63/0853
2025/0313172 A1* 10/2025 Knott ...................... B60R 25/24
2025/0337583 A1* 10/2025 Knott ........................ H04L 9/40

* cited by examiner

DIGITAL KEY MANAGEMENT METHOD FOR HOME-TO-HOME SERVICE

CROSS-REFERENCE TO RELATED APPLICATION

This application claims the benefit of and priority to Korean Patent Application No. 10-2023-0141259, filed on Oct. 20, 2023, the entire contents of which are hereby incorporated herein by reference.

TECHNICAL FIELD

The present disclosure relates to a digital key management method for a home-to-home (H2H) service.

BACKGROUND

A home-to-home (H2H) service that has been receiving attention in recent years is a service that, under a vehicle warranty, picks up a vehicle of a customer from a location desired by the customer and then drops it off at a location desired by the customer after a repair and maintenance procedure is completed.

For the H2H service, a pick-up driver comes to a location where a vehicle of a customer is present, receives a smart key in person and takes over the vehicle, and then, after a repair and maintenance procedure is all completed, drives the vehicle of the customer to drop it off at a drop-off location, and hands over the smart key to the customer, and the service ends here.

The smart key, which is also referred to as a “key fob,” is a device that enables a user or driver to open and close doors of a vehicle and start the vehicle without inserting a separate key or operating an operating button.

In a typical method to perform the H2H service, it is necessary to hand over a smart key of a vehicle to a pick-up driver, which may cause security concerns on the customers’ side because the smart key is used as a final authentication means to activate various services for the vehicle.

Additionally, although the smart key and its additional related techniques allow a user to start a vehicle only when the smart key is with the user, in an exceptional case such as a connected car service, the user may remotely start the vehicle through a telematics service, get on the vehicle, and switch an operating mode to a normal start mode.

As the research on the connected car service is on the rise, a smart-key-free start method that allows a user to directly start a vehicle using their smartphone, i.e., a mobile communication device, without a smart key, is in development.

Accordingly, a recent connected car service uses a digital key technique to provide services such as opening the doors of a vehicle and starting the vehicle by a mobile communication terminal through a near-field communication (NFC)/Bluetooth low energy (BLE) protocol. This technology is widely used in the general field of door locks and remote control.

Particularly, in a method using a mobile communication terminal-based digital key, a vehicle may be directly connected to a mobile communication terminal without communicating with a server via a telecommunication network, and may thus operate without a problem even in a service-unavailable area, or an out-of-service area. In addition, using this method, no additional costs may be incurred because no telecommunication service is used.

Further, the mobile communication terminal-based digital key may be shared, and thus a person with whom the mobile communication terminal-based digital key is shared may be able to use the vehicle without going through any additional process.

In this case, however, sharing the vehicle by the mobile communication terminal-based digital key may involve various restrictions. The restrictions may include, for example, allowing the vehicle to be available only for three hours or allowing only the trunk of the vehicle to be opened.

However, there may be a replay attack that randomly uses such a mobile communication terminal-based digital key for a vehicle that is not connected to the Internet, and there may thus be a risk of vehicle theft using this typical mobile communication terminal-based digital key.

In addition, the typical mobile communication terminal-based digital key may be generated infinitely, independent of a physical real key, which may make it difficult to manage the digital key. For example, the more digital keys generated for a single vehicle, the more difficult it is to manage the digital keys.

Further, the mobile communication terminal-based digital key may be provided as an encrypted text message for vehicle sharing, and this encrypted text message may be decrypted by others, which, as a result, may make it difficult to prevent illegal use of the digital key.

In the case of the typical digital key, a user needs to continuously delete an old digital key and receive a new one to share a vehicle, and when sharing vehicles of different manufacturers, using an application (or app) on a mobile communication terminal may be restricted, or a user may experience inconvenience by having to use multiple apps for the respective manufacturers.

Further, the typical digital key for vehicle sharing may be affected by the update of an app store of a mobile communication terminal in which the digital key is registered and by the compatibility of an operating system, which may make it difficult to manage the digital key.

Further, a vehicle sharing service using the typical mobile communication terminal-based digital key may require great resources to manage the start and end of the vehicle sharing service, manage users for vehicle sharing, perform charging (or billing), or the like.

As described above, although the H2H service increases user convenience, there may also be a clear disadvantage that a smart key needs to be handed over to a pick-up driver in person. Further, the typical mobile communication terminal-based digital key may also require a user to perform a considerably inconvenient process of signing up for and canceling a car-sharing service only for the H2H service.

SUMMARY

An object of the present disclosure is to solve the issues described above.

An object of the present disclosure is to provide a method of managing a digital key for a home-to-home (H2H) service, that may remove the possibility of various security-related issues that may occur when a smart key is handed over directly to a pick-up driver in a face-to-face manner for the H2H service, improve the inconvenience of having to hand over an authentication means for starting a vehicle directly to the pick-up driver, restrict the authority of the key delivered to the pick-up driver, and collect and verify information about the vehicle occurring during designated driver driving, in order to strengthen the security aspect of the vehicle.

According to an embodiment of the present disclosure, a method for providing home-to-home (H2H) service for a vehicle by use of a digital key is provided. The method includes receiving, by a management server, a request for the H2H service through an application (app) on a terminal of a service applicant. The method also includes selecting, by the management server, a pick-up driver for picking up the vehicle and allowing a digital key of the vehicle to be shared and activated as a first shared digital key. The method additionally includes allowing, by the vehicle, for the pick-up driver to drive the vehicle using the first shared digital key so that the vehicle is handed over to a mechanic. The method further includes allowing, by the management server, the digital key of the vehicle to be shared and activated as a second shared digital key through an app on a terminal of a mechanic. The method further still includes allowing, by the vehicle, for the mechanic to perform repair and maintenance on the vehicle and drive the vehicle to the pick-up driver using the second shared digital key. The method also includes allowing, by the vehicle, for the pick-up driver to drive the vehicle to a drop-off location designated by the service applicant.

In an embodiment, the digital key management method may further include, deactivating, by the management server, the first shared digital key.

In an embodiment, the method may further include receiving, by the management server, a pick-up location and the drop-off location for the vehicle.

In an embodiment, the method may further include receiving, by the management server, a consent to share an authority of the digital key of the vehicle.

In an embodiment, allowing the digital key of the vehicle to be shared and activated as the first shared digital key includes: allowing, by the management server, the digital key of the vehicle to be shared as the first shared digital key through an app on a terminal of the pick-up driver; and activating, by the management server, an authority of the first shared digital key according to a request from the pick-up driver.

In an embodiment, allowing the digital key of the vehicle to be shared and activated as the first shared digital key further includes receiving, by the management server, an input related to a service procedure through the app on the terminal.

In an embodiment of the digital key management method, allowing the digital key of the vehicle to be shared and activated as the first shared digital key further includes notifying, by the management server, the service applicant of the service procedure.

In an embodiment, activating the authority of the first shared digital key according to the request from the pick-up driver includes: transmitting an authority activation request for activating the authority for using the digital key to the management server through the app on the terminal of the pick-up driver; notifying, by the management server, the service applicant of the pick-up of the vehicle for the H2H service and receiving a consent from the service applicant through the app on the terminal of the service applicant; and activating, by the management server, the authority of the first shared digital key based on the consent.

In an embodiment, the activated authority of the digital key may be limited to an authority to open and close doors of the vehicle and to start and drive the vehicle.

In an embodiment, the activated authority of the digital key may include forcibly turning on a video recording device of the vehicle in a driving mode.

In an embodiment, allowing the digital key of the vehicle to be shared and activated as the second shared digital key through the app on the terminal of the mechanic includes activating, by the management server, an authority of the second shared digital key according to a request from the mechanic.

In an embodiment, allowing the digital key of the vehicle to be shared and activated as the second shared digital key through the app on the terminal of the mechanic further includes receiving, by the mechanic, an input related to a repair and maintenance procedure through the app on the terminal of the mechanic.

In an embodiment, allowing the digital key of the vehicle to be shared and activated as the second shared digital key through the app on the terminal of the mechanic includes notifying, by the management server, the service applicant of the repair and maintenance procedure.

In an embodiment, activating the authority of the second shared digital key according to a request from the mechanic includes: transmitting an authority activation request to activate the authority for using the second shared digital key to the management server through the app on the terminal of the mechanic; notifying, by the management server, the service applicant of the authority activation request, and receiving a consent from the service applicant for the authority activation request from the mechanic; and in response to the consent from the service applicant of the vehicle, activating, by the management server, the authority of the second shared digital key.

In an embodiment, the activated authority of the second shared digital key is limited to an authority to open and close doors of the vehicle and start and drive the vehicle.

In an embodiment, allowing for the mechanic to drive the vehicle to the pick-up driver using the second shared digital key includes deactivating the authority of the second shared digital key through the app on the terminal of the mechanic.

In an embodiment, the digital key management method may further include, notifying, by the management server, the service applicant of termination of the H2H service and canceling the first and/or second shared digital key.

According to embodiments of the present disclosure, a digital key management method for an H2H service may provide optimal convenience to customers by linking a digital key system and the H2H service. The digital key management method may assign a digital key with the consent of a vehicle owner; assign the digital key by linking an operating time of the digital key with a structure of the service or set an authority under which operations and driving of a greater level than consented are not allowed; assign the authority to the digital key in accordance with the service; and, only with a consent process performed by a user, monitor a situation where the authority is assigned and withdrawn, thereby preventing the authority from being excessively assigned.

According to embodiments of the present disclosure, using the digital key management method for the H2H service may, even in the case of a service in which a person other than a vehicle owner moves a vehicle (e.g., designated driver driving or chauffeur service), provide traceable data in the event of an accident by using global positioning system (GPS) information and built-in camera recordings of the vehicle, thereby strengthening security against misuse.

DETAILED DESCRIPTION

Figure 1A:
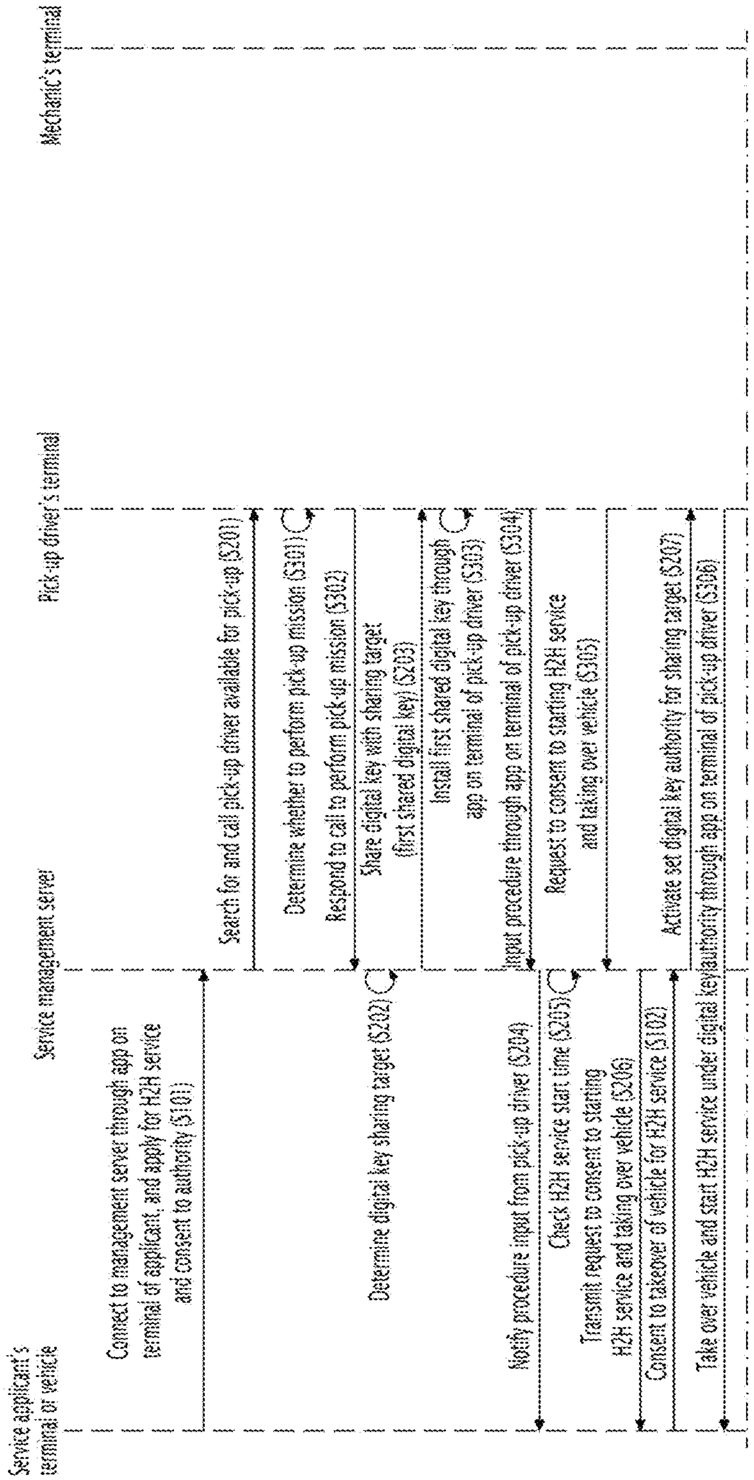
FIGS. 1A and 1B are diagrams illustrating an example flow of operations performed among a vehicle owner, a management server, a pick-up driver, and a mechanic, in a digital key management method for a home-to-home (H2H) service according to an embodiment of the present disclosure.

Hereinafter, embodiments of the present disclosure are described in detail with reference to the accompanying drawings. The embodiments should not construed be as limited to the present disclosure. Rather, the present disclosure should be understood to include all changes, equivalents, and replacements within the idea and the technical scope of the present disclosure.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation.

Although terms including ordinal numbers, such as "first," "second," or the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it should be understood that on or more other elements may be present therebetween. In contrast, when an element is described as "directly coupled" or "directly connected" to another element, it should be understood that there are no other elements therebetween.

When a component, device, module, element, or the like of the present disclosure is described as having a purpose or performing an operation, function, or the like, the component, device, or element should be considered herein as being "configured to" meet that purpose or perform that operation or function.

The singular forms "a," "an," and "the" are intended to include the plural forms as well, unless the context clearly indicates otherwise. It should be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless defined, all terms including otherwise technical and scientific terms used herein have the same meaning as commonly understood by one of ordinary skill in the art to which the present disclosure pertains. Terms such as those defined in commonly used dictionaries should be interpreted as having a meaning that is consistent with their meaning in the context of the relevant art and the present disclosure, and should not be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, or the like, and one or more processors that perform determination, calculation, decision, or the like that are necessary for controlling a function assigned thereto.

A processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

The recording medium may be electrically connected to the processor, and the processor may load and record data from the recording medium. The recording medium and the processor may be integrated or may be physically separated.

Hereinafter, a digital key management method for a home-to-home (H2H) service (also simply referred to herein as an "H2H service digital key management method") and a system thereof is described in more detail with reference to the accompanying drawings.

Figure 1B:
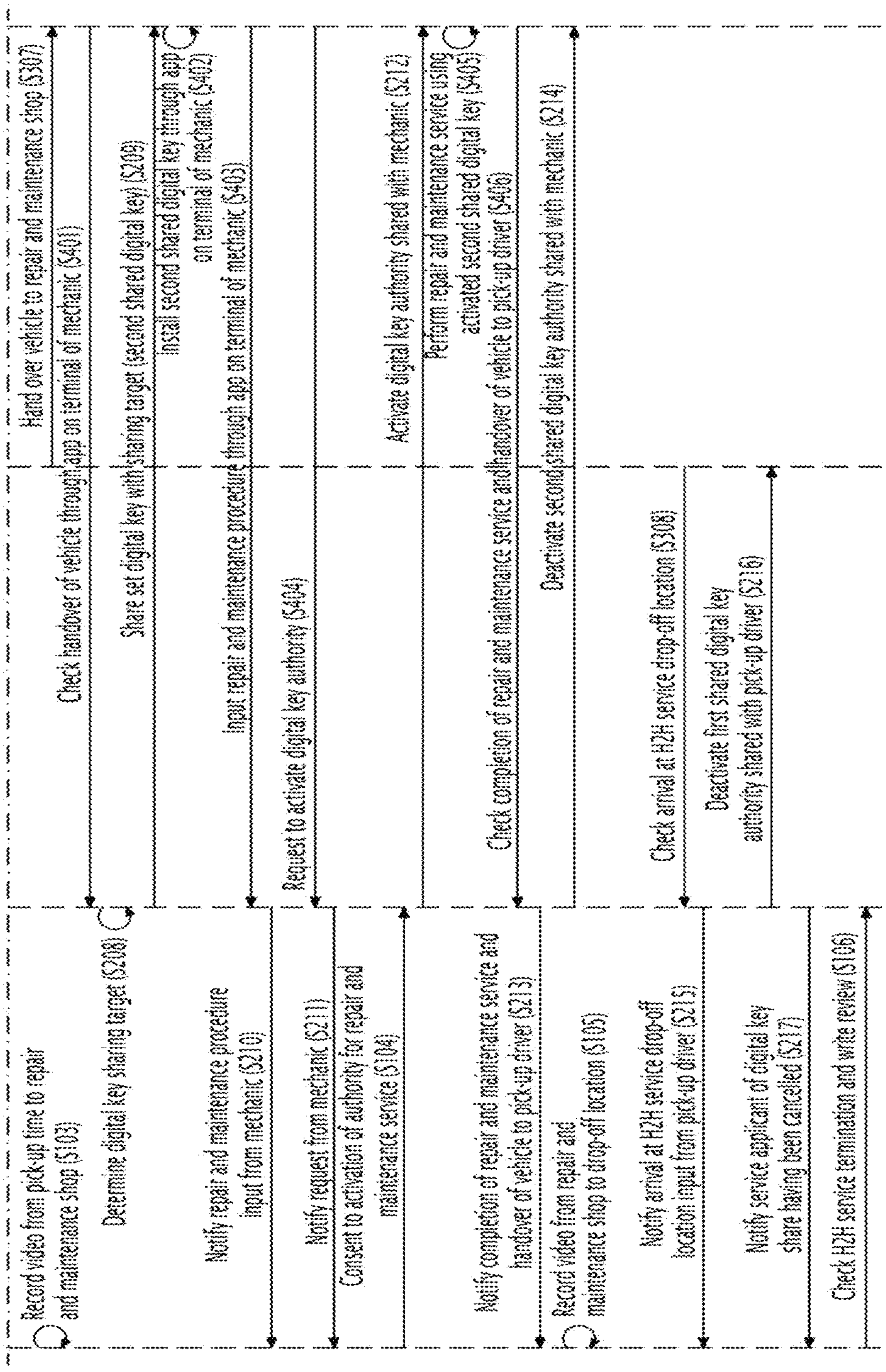

FIGS. 1A and 1B are diagrams illustrating an example flow of operations performed among an owner of a vehicle (also simply a "vehicle owner"), a management server, a pick-up driver, and a mechanic, in a digital key management method for an H2H service according to an embodiment of the present disclosure.

Referring to FIG. 1A, in a step or operation S101, after connecting to a management server through an application (or "app") on a terminal of a vehicle owner, the vehicle owner may apply for an H2H service and consent to a transfer of an authority involved in sharing a digital key for controlling the vehicle. The vehicle owner may also set a pick-up location and a drop-off location for the vehicle.

In a step or operation S201, the management server, which may be an H2H service management server, may search for a pick-up driver who is available to pick up the vehicle based on the pick-up location and the drop-off location of the vehicle set by the vehicle owner and may call the pick-up driver.

In a step or operation S301, the pick-up driver called in the step or operation S201 may determine whether they are available to perform such a pick-up mission and, if so, proceed to a step or operation S302 to respond to the call to perform the pick-up mission.

Subsequently, in a step or operation S202, the management server may determine a sharing target with which the digital key is to be shared in the step or operation S202, and may share the digital key as a first shared digital key with the pick-up driver, determined as the sharing target, in a step or operation S203.

The pick-up driver may install the shared digital key through an app on a terminal of the pick-up driver in a step or operation S303, and may input a procedure in a step or operation S304. The procedure may include an available pick-up time.

In a step or operation S204, the management server may transmit and notify the vehicle owner of the procedure input from the pick-up driver in the step or operation S304. Subsequently, in a step or operation S205, the management server may check a start time of the H2H service based on the procedure of the pick-up driver.

After arriving at the location desired by the vehicle owner for the pick-up, the pick-up driver may check the vehicle. When the pick-up driver determines that the vehicle is one they need to pick up, the pick-up driver may request the management server to consent to them starting the H2H service and taking over the vehicle for the service in a step or operation S305.

In a step or operation S206, in response to the request of the pick-up driver, the management server may transmit and notify the vehicle owner of the request for the handover of the vehicle input from the pick-up driver in a step or operation S305. In a step or operation S102, the vehicle owner may consent to the handover of the vehicle.

Subsequently, in a step or operation S207, the management server may activate an authority of the digital key shared with the pick-up driver.

In an embodiment, the authority of the digital key activated in the step or operation S207 may be limited to an authority for opening and closing the doors of the vehicle and starting and driving the vehicle and, if necessary (as set by the driver), may provide a control authority such that a video recording device of the vehicle is forced to be turned on in a driving mode.

In an embodiment, the authority of the digital key shared with the pick-up driver may include the control authority to forcibly turn on the video recording device of the vehicle.

In a step or operation S306, when the digital key is activated in the step or operation S207, the pick-up driver may take over the vehicle under the authority of the digital key through the app on the terminal of the pick-up driver and start the H2H service.

Referring to FIG. 1B, in a step or operation S103, the vehicle may record all the situations occurring while the pick-up driver is driving the vehicle to a repair and maintenance shop from a pick-up time, under the control authority allowing the video recording device to forcibly operate, which is included in the authority of the digital key.

The pick-up driver may hand over the vehicle to the repair and maintenance shop in a step or operation S307, and a mechanic at the repair and maintenance shop may check that the vehicle has taken over successfully after accessing the management server through an app on a terminal of the mechanic in a step or operation S401.

In addition to what has been described above, the management server may share matching information of the pick-up driver with a customer. At the same time, the management server may perform a consent and sharing procedure for "valet-related digital key sharing" through a connected app (e.g., Blue Link, Kia Connect, etc.) of the customer. In this case, a user may consent to an authority for only a corresponding service through the connected app, and the actual digital key sharing may be performed through the server based on the authority, a target, and a time.

In an embodiment, the sharing target may also be associated with a personal account of the pick-up driver or the mechanic, and after sharing an authority or right with a company account such as a pick-up service agency or a repair and maintenance shop, a procedure may be performed such that the authority or right is to be delegated to some personnel registered in the company. In the case of the setting with the personal account, a sharing message may be immediately transmitted to a corresponding smartphone. In the case of the setting with the company account, a message may be transmitted after designating a driver.

In a case of sharing the digital key through a guided link related to a scheduled service such as repair and maintenance, the sharing target (e.g., phone number or company name), authority, and time information may be set based on a scheduled repair and maintenance time reserved by the customer. In addition, in a case of changing the scheduled repair and maintenance information, the information may be linked to the server to be applied to the shared key. Through this process, the digital key of the vehicle may be stored on the terminal (e.g., a smartphone) of the pick-up driver. When information about the pick-up driver changes or the reservation is canceled, the authority of the digital key may be withdrawn through the server.

In an embodiment, the digital key sharing procedure is as follows: (1) obtain a consent to an authority for a service of an owner through an app; (2) transmit a digital key sharing message to a smartphone of a person who is to perform a mission authorized by the owner or their agency; (3) install a digital key on a smartphone of the person (there may be no need to install the app, and the digital key may be operated from a default app on the smartphone); (4) in this case, the shared key installed on the smartphone of the person who is to perform the mission is in an unauthorized state, i.e., has no control authority for a vehicle; and (5) in response to information about a start/end time of the mission being input through the system such as the app, check, by the server, the identity and authority of the person and activate/deactivate the authority of the key.

When the management server checks that the vehicle has been successfully handed over to the repair and maintenance shop in a step or operation S401, the management server may then determine a target (e.g., the mechanic) of sharing the digital key in a step or operation S208, and may allow the determined target to share the digital key as a second shared digital key in a step or operation S209.

The mechanic with whom the digital key is shared in the step or operation S209 may install the shared digital key in a step or operation S402 and may input a repair and maintenance procedure through an app on their terminal in a step or operation S403.

The management server receiving information about the repair and maintenance procedure input in the step or operation S403 may notify the vehicle owner of the repair and maintenance procedure in a step or operation S210.

When performing the repair and maintenance procedure on the vehicle, the mechanic may request the management server to activate the digital key of the vehicle for them to start a repair and maintenance service in a step or operation S404.

In a step or operation S211, the management server may then notify the vehicle owner of such a digital key activation request from the mechanic input in a step or operation S404. In a step or operation S112, the vehicle owner may then consent to the vehicle repair and maintenance.

In a step or operation S212, the management server may then activate the authority of the digital key shared with the mechanic.

In an embodiment, the authority of the digital key activated in the step or operation S212 may be limited to an authority to open and close the doors of the vehicle, start the vehicle, and provide the repair and maintenance service to the vehicle.

Once the digital key is activated in the step or operation S212, the mechanic may perform the repair and maintenance procedure on the vehicle under the authority of the digital key on the app on the terminal of the mechanic in a step or operation S405.

When the repair and maintenance procedure is completed, the mechanic may hand over the vehicle to the pick-up driver and check it with the management server in a step or operation S406.

In a step or operation S213, the management server may notify the vehicle owner that the repair and maintenance has been completed and the vehicle has been handed over to the pick-up driver.

In a step or operation S214, the management server may also deactivate the authority of the digital key shared with the mechanic.

In an embodiment, while the pick-up driver is moving from the repair and maintenance shop to the drop-off location of the vehicle, the video recording device may be forced to operate to record a video in a step or operation S105 in the same way as in the step or operation S103, for example.

When the pick-up driver moves the vehicle to the drop-off location, the pick-up driver may notify the management server that the vehicle has arrived at the H2H service drop-off location in a step or operation S308.

In a step or operation S215, the management server may notify the vehicle owner of information indicating that the vehicle has arrived at the drop-off location notified in the step or operation S308. In a step or operation S216, the management server may then deactivate the authority of the digital key shared with the pick-up driver.

In a step or operation S217, the management server may then notify the vehicle owner that the setting of sharing the digital key for the H2H service has been canceled as the H2H service has been completed.

In a step or operation S106, the vehicle owner may check the termination of the H2H service and additionally write a review or the like.

According to an embodiment of the present disclosure, the digital key management method for an H2H service described above may assign a digital key by consent from a vehicle owner, and set an authority of the digital key by linking an operating time of the digital key with a structure of the service such that an operation or driving beyond the assigned or consented authority is unavailable. Thus, only with a consent procedure by a user by setting the authority of the digital key in accordance with the service, it is possible to monitor a situation in which the authority is assigned and withdrawn and prevent an excessive exertion of the authority.

In addition, even in a case of using a service (e.g., designated driver driving or chauffeur service) where a person other than the vehicle owner moves the vehicle, it is possible to prepare traceable data in the event of an accident through global positioning system (GPS) information about the vehicle and recorded built-in camera videos and strengthen security against misuse.

While embodiments of the present disclosure have been shown and described above, it should be apparent to one of ordinary skill in the art that various modifications or changes in form and details may be made in these embodiments without departing from the spirit and scope of the claims and their equivalents.

What is claimed is:

1. A method for providing home-to-home (H2H) service for a vehicle by use of a digital key, the method comprising:

receiving, by a management server, a request for the H2H service through an application (app) on a terminal of a service applicant;

selecting, by the management server, a pick-up driver for picking up the vehicle and allowing the digital key of the vehicle to be shared and activated as a first shared digital key;

allowing, by the vehicle, for the pick-up driver to drive the vehicle using the first shared digital key so that the vehicle is handed over to a mechanic;

allowing, by the management server, the digital key of the vehicle to be shared and activated as a second shared digital key through an app on a terminal of a mechanic;

allowing, by the vehicle, for the mechanic to perform repair and maintenance on the vehicle using the second shared digital key so that the vehicle is handed over to the pick-up driver; and allowing, by the vehicle, for the pick-up driver to drive the vehicle to a drop-off location designated by the service applicant using the first shared digital key.

2. The method of claim 1, further comprising deactivating, by the management server, the first shared digital key.

3. The method of claim 1, further comprising receiving, by the management server, a pick-up location and the drop-off location for the vehicle.

4. The method of claim 1, further comprising receiving, by the management server, a consent to share an authority of the digital key of the vehicle.

5. The method of claim 1, wherein allowing the digital key of the vehicle to be shared and activated as the first shared digital key includes:

allowing, by the management server, the digital key of the vehicle to be shared as the first shared digital key through the app on the terminal of the pick-up driver; and activating, by the management server, an authority of the first shared digital key according to a request from the pick-up driver.

6. The method of claim 5, wherein allowing the digital key of the vehicle to be shared and activated as the first shared digital key further includes receiving, by the management server, an input related to a service procedure through the app on the terminal of the pick-up driver.

7. The method of claim 6, wherein allowing the digital key of the vehicle to be shared and activated as the first shared digital key further includes notifying, by the management server, the service applicant of the service procedure.

8. The method of claim 5, wherein activating the authority of the first shared digital key according to the request from the pick-up driver includes:

transmitting an authority activation request for activating the authority for using the digital key to the management server through the app on the terminal of the pick-up driver;

notifying, by the management server, the service applicant of pick-up of the vehicle for the H2H service and receiving a consent from the service applicant through the app on the terminal of the service applicant; and activating, by the management server, the authority of the first shared digital key based on the consent.

9. The method of claim 8, wherein the activated authority of the digital key is limited to an authority to open and close doors of the vehicle and to start and drive the vehicle.

10. The method of claim 8, wherein the activated authority of the digital key includes forcibly turning on a video recording device of the vehicle in a driving mode.

11. The method of claim 1, wherein allowing the digital key of the vehicle to be shared and activated as the second shared digital key includes activating, by the management server, an authority of the second shared digital key according to a request from the mechanic.

12. The method of claim 11, wherein allowing the digital key of the vehicle to be shared and activated as the second shared digital key further includes receiving, by the mechanic, an input related to a repair and maintenance procedure through the app on the terminal of the mechanic.

13. The method of claim 12, wherein allowing the digital key of the vehicle to be shared and activated as the second shared digital key includes notifying, by the management server, the service applicant of the repair and maintenance procedure.

14. The method of claim 11, wherein activating of the authority of the second shared digital key according to the request from the mechanic includes:

transmitting an authority activation request to activate the authority for using the second shared digital key to the management server through the app on the terminal of the mechanic;

notifying, by the management server, the service applicant of the authority activation request and receiving a consent from the service applicant for the authority activation request from the mechanic; and in response to the consent from the service applicant of the vehicle, activating, by the management server, the authority of the second shared digital key.

15. The method of claim 14, wherein the activated authority of the second shared digital key is limited to an authority to open and close doors of the vehicle and start and drive the vehicle.

16. The method of claim 1, wherein allowing for the mechanic to drive the vehicle to the pick-up driver using the second shared digital key includes deactivating an authority of the second shared digital key through the app on the terminal of the mechanic.

17. The method of claim 1, further comprising notifying, by the management server, the service applicant of termination of the H2H service and canceling one or both of the first shared digital key or second shared digital key.

* * * * *